Patented Jan. 17, 1939

2,144,368

UNITED STATES PATENT OFFICE 2,144,368

OXIDATION INHIBITOR FOR INSECTICIDES

Dalton B. Faloon, Beacon, N. Y., assignor to Hammond Paint & Chemical Co., Inc., Beacon, N. Y., a corporation of New York No Drawing. Application May 14, 1938, Serial No. 208,054

5 Claims. (Cl. 167—24)

The present application and invention covered thereby is a continuation-in-part of my copending application Serial No. 695,001, filed October 24, 1933.

This invention relates, generally, to insecticides and the invention has reference, more particularly, to means for preventing the more or less rapid deterioration of insecticides such as pyrethrum and rotenone in use.

Organic insecticides heretofore produced such as pyrethrum and rotenone have been found to lose their toxic properties more or less rapidly so that ofttimes after these substances have been stored or unused for a time their value as insecticides is greatly reduced and cannot produce the results desired.

This is particularly true of insecticide solutions, and it has been known that the presence of alkaline materials, such as sodium and potassium salts in the insecticide solution or the presence of moisture also greatly accelerates the rate of deterioration. Also, exposure to the air and sunlight serve to rapidly lower the toxic value of such solutions.

The deterioration also proceeds even though the insecticide solutions are confined and isolated from light, due, I have found, to the catalytic action of small amounts of inorganic substances present and to the natural affinity of such organic substances as pyrethrum and rotenone for oxygen. This deterioration also takes place in powdered organic insecticides but at a slower rate than when the insecticides are in solution.

In my work, I have determined that oxidation is the main cause of loss of toxicity in insecticides and that the rate of deterioration varies in proportion to the ability of oxygen to come in contact with the individual units of the toxic substances.

The principal object of the present invention is to provide a method for preventing the rapid oxidation and consequent deterioration of organic insecticides.

Another object of this invention is to provide means which when added to organic insecticides will enable such insecticides to be stored for relatively long periods without appreciable loss of toxicity.

Still another object of this invention is to provide means which may be readily dispersed throughout the mass of an insecticide, the said means serving to blanket and protect the toxic ingredients of the insecticide against oxidation, thereby enabling such protected insecticide to be left exposed to light and air without appreciable deterioration of the toxic character of the same.

These objects are achieved by the following invention, that enables organic insecticides which possess the objections here under consideration, to be stabilized and protected from deterioration without altering their toxic properties or field of use, by additions of oxidation inhibitors and by controlling the character and magnitude of such additions so that the desired protection of the insecticide composition is obtained for unlimited periods. In particular, it has been found that relatively small amounts of naphthalamines and their esters are especially adaptable for use as oxidation inhibitors for these purposes.

In carrying out the present invention, extract derivatives from toxic organic substances are prepared according to the known methods of the art using various solvents and adding the oxidation inhibitors or negative catalysts of this invention. It was found that various solvents required greatly varying percentages of negative catalysts for producing uniform results. Also, the relative solubility of a particular oxidation inhibitor in any particular solvent was found to be highly important in determining the percentage of inhibitor to be used. To be effective, it is essential that the oxidation inhibitor be completely dispersed throughout the insecticide composition and that no separation occurs during storage after manufacture. Some solvents permit the use of certain types of inhibitors which are not readily dispersed in other types of solvents. I have found that the more completely the oxidation inhibitor is dispersed in the vehicle the more effective the inhibitor becomes.

The following products are specific examples of some of the naphthalamines and derivatives which have been found satisfactory as oxidation inhibitors or negative catalysts in the present process:—Naphthylamine, phenyl alpha-naphthylamine, dibeta naphthylamine.

The quantity of any particular oxidation inhibitor used in any particular insecticide composition is dependent upon variable factors and for this reason no hard and fast rule can be laid down. Not only the nature of the insecticide used but also the nature of the solvent or vehicle employed with the insecticide play an important part in determining the quantity or proportion of oxidation inhibitor necessary to protect the insecticide against deterioration. The various solvents that may be used as a vehicle such as alcohol, acetone, carbon tetrachloride, ethylene dichloride, neutral petroleum oil, kerosene, gasolene, mineral spirits, etc., or mixtures of two or more of these solvents vary in their respective abilities to disperse the inhibitor or negative catalyst used in any instance so that different proportions of any particular catalyst are necessary with different vehicles. Acetone, for example, which may contain some moisture requires more negative catalyst to inhibit oxidation than a vehicle of alcohol. Vehicles containing sulphonated oils or moisture require larger proportions of inhibitors than those not having these ingredients therein.

In general, I have found that the quantity of the negative catalyst or oxidation inhibitor necessary to overcome premature oxidation or deterioration of the toxic principles of organic insecticides will be less than 1% by weight on the basis of total composition. In some cases quantities of inhibitors as low as .05% or even lower by weight of the total composition have appreciable effects, while in other cases .6% and .8% are more effective. In rare combinations of vehicles, quantities of inhibitors in excess of 1% and up to the amount of 1.5% by weight of the total combination have been required to obtain the desired results. It is understood however that I do not wish to limit myself entirely to percentages below 1.5%, because greater percentages of the inhibitors may be used, although the additional benefits or protection derived by the use of larger percentages than 1.5% are generally substantially negligible.

Owing to the great number and diversity of insecticide compositions comprising toxic substances such as rotenone, pyrethrum, derris, etc., and a great variety of vehicles and vehicle combinations, which compositions I have found to be protected against oxidation by the previously mentioned inhibitors, it is impracticable to list the ingredients of all such compositions. However, a representative example of an insecticide composition is given below, the ingredients listed being mixed together with stirring in the percentages given by weight:

| Composition | Percent by weight |
|---|---|
| Pyrethrum | 2.5 |
| Naphthylamine | .8 |
| Alcohol | 90.00 |
| Acetone | 6.70 |

Having thus described my invention, what I claim and desire to protect by Letters Patent is:

1. An insecticide comprising an easily oxidizable organic vegetable toxic material of the group consisting of pyrethrum and rotenone and a naphthylamine to stabilize the same.

2. An insecticide comprising pyrethrum and phenyl alpha naphthylamine to stabilize the same.

3. An insecticide comprising pyrethrum and dibeta naphthylamine to stabilize the same.

4. An insecticide comprising rotenone and phenyl alpha naphthylamine to stabilize the same.

5. An insecticide comprising rotenone and dibeta naphthylamine to stabilize the same.

DALTON B. FALOON.